Patented May 6, 1941

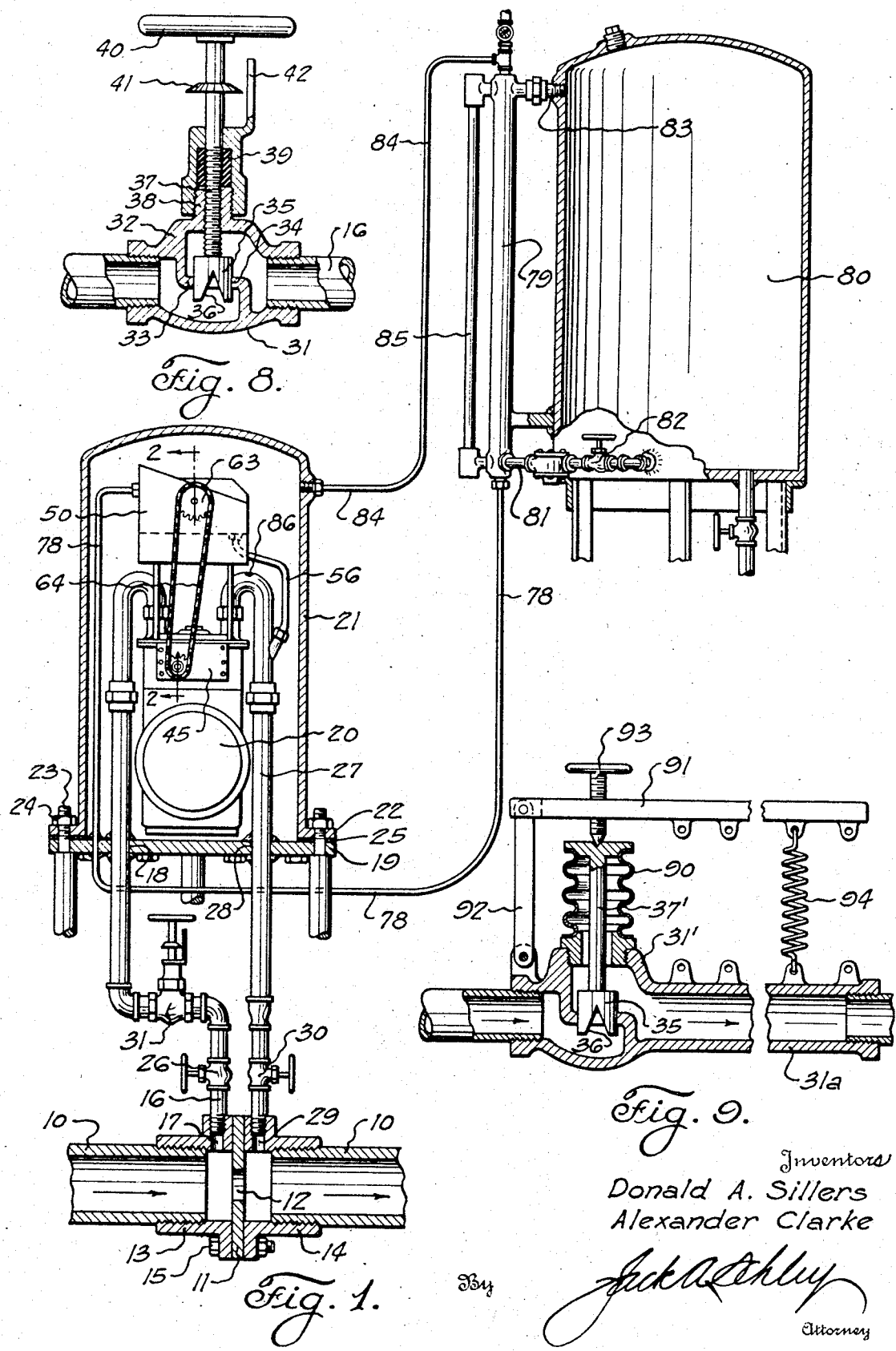

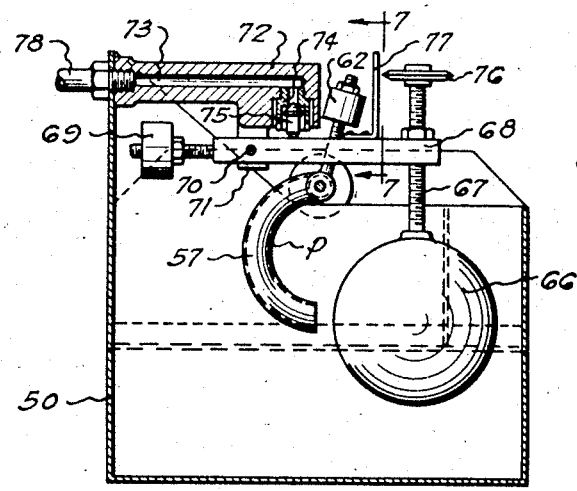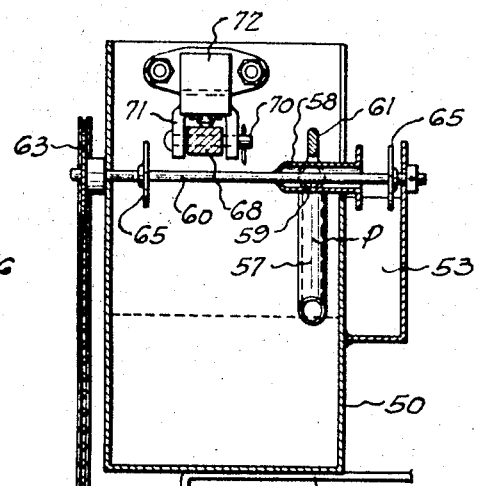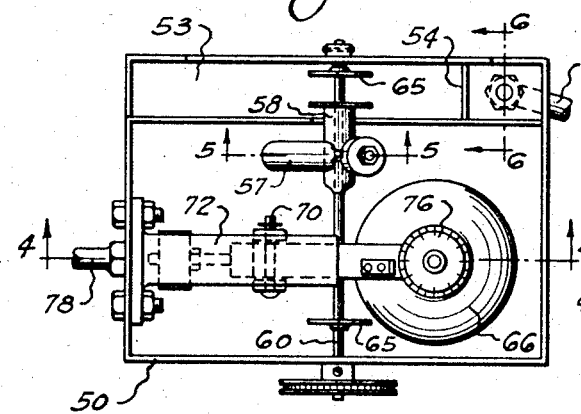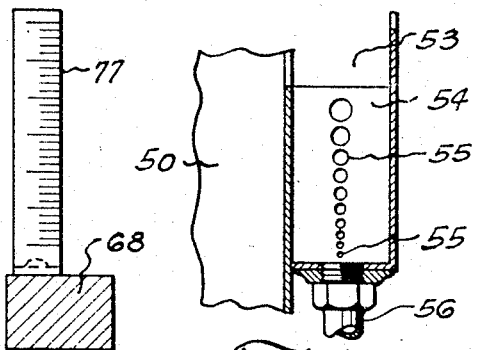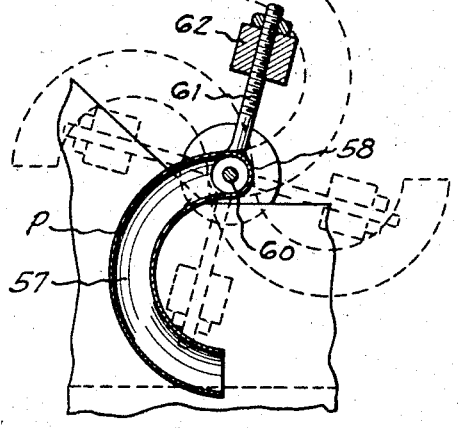

2,240,808

UNITED STATES PATENT OFFICE 2,240,808

MEANS FOR INTRODUCING LIQUID INTO FLOWING FLUIDS

Donald A. Sillers, Dallas, and Alexander Clarke, Coleman, Tex.; said Clarke assignor to said Sillers Application June 28, 1939, Serial No. 281,696

9 Claims. (Cl. 261—28)

This invention relates to new and useful improvements in means for introducing liquid into flowing fluids.

The invention particularly has to do with the introduction of an odorizing liquid into a confined flowing stream of gas so as to impart a distinctive and recognizable odor to said gas.

The usual type of devices and apparatus which are in general use, for this purpose, are responsive to variations in the velocity of gas flow through the flow line, but are not responsive to an increase or decrease in the quantity of the gas when the static or normal pressure of the gas is increased or decreased. Therefore, if a pressure change occurs in the flowing stream to vary the quantity of gas flowing through the apparatus, an inaccurate feeding of the odorant into the flow line occurs. Further, the liquids, generally used as odorants, have vapor pressures which vary according to their temperature and pressure conditions and, also, the flow characteristics of said liquids vary according to their viscosity and temperature. In the usual type of odorizing apparatus, no provision has been made for compensating for these variables, with the result that said variables affect the operation to produce inaccurate feeding or introduction of the liquid into the line.

It is, therefore, one object of this invention to provide an improved means for introducing a liquid into a flowing gas stream in quantities directly proportional to the quantity of gas flow; said method being unaffected by variations in pressure in the flow line, or variations in viscosity, temperature or pressure of the liquid, whereby an accurate and predetermined amount of liquid per million cubic feet of gas may be introduced into the flowing gas stream.

An important object of the invention is to provide an improved means for introducing a liquid odorant into a flowing gas stream which includes, setting up a pressure differential in the stream, by-passing a portion of the gas through a flow meter, and setting up a differential in the by-pass line, whereby this latter differential is at all times proportional to the differential in the main stream and may be utilized to control the introduction of the liquid odorant into the stream, thereby assuring the introduction of the liquid in quantities directly proportional to the volume of gas flow.

Another object of the invention is to provide an improved odorizing apparatus, wherein a portion of the flowing gas is by-passed around a pressure differential pressure producing element in the main gas stream and is directed through a suitable meter to operate said meter, together with means for utilizing the meter to drive a feed pump which introduces a liquid odorant into the main gas stream; the arrangement actuating the pump in direct proportion to the volume of gas flowing through the line.

A further object of the invention is to provide an improved apparatus, of the character described, wherein a variable orifice is disposed within the by-pass line, whereby variations in the pressure of the gas flowing through the main flow line may be readily compensated for to change the output of the liquid pump and to maintain the introduction of the quantity of liquid directly proportional to the volume of gas flowing through the main line; the orifice being arranged to be either manually or automatically operated.

Still another object of the invention is to provide an improved feed pump for an odorizing apparatus which is so constructed that it is unaffected by temperature and pressure conditions, whereby it will deliver a predetermined quantity of volume of liquid during each cycle of operation.

A particular object of the invention is to provide an improved apparatus, of the character described, wherein a pressure differential is created in the flowing gas stream and a by-pass line conducts a portion of the gas around the point of such differential, said by-pass also having a pressure differential set up therein which is directly proportional to the pressure differential in the main stream, the gas flowing through the by-pass being utilized to drive a liquid odorant pump which is readily adjustable to inject a predetermined quantity of liquid odorant into the main stream; the arrangement making it possible to readily compensate for variations in the pressure of the main gas stream, either by changing the flow orifice in the by-pass line or by varying the output of the pump.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a view partly in elevation and partly in section of an odorizing apparatus, constructed in accordance with the invention, Figure 2 is a transverse, vertical, sectional view, taken on the line 2—2 of Figure 1, Figure 3 is a plan view of the receptacle or tank which receives the liquid odorant and which has the liquid pump mounted therein, Figure 4 is a longitudinal, vertical, sectional view, taken on the line 4—4 of Figure 3, Figure 5 is a vertical, sectional view, taken on the line 5—5 of Figure 3, and illustrating the various positions of the pump mechanism, Figure 6 is a transverse, vertical, sectional view, taken on the line 6—6 of Figure 3, Figure 7 is a transverse, vertical, sectional view, taken on the line 7—7 of Figure 4, Figure 8 is a transverse, vertical, sectional view, taken through the precision valve which is connected in the by-pass line, said valve being manually operated, and Figure 9 is a transverse, vertical, sectional view of an automatically operated precision valve.

In the drawings, the numeral 10 designates a flow line or pipe, through which the gas is flowing. An orifice plate 11, having an axial orifice 12 therein, is mounted in the flow line 10 and, as is clearly shown in Figure 1, the plate is confined between the ends of a pair of flanged collars 13 and 14, said collars being secured to the extremities of adjacent pipe sections which make up the flow line. The outwardly directed flanges of the collars 13 and 14 abut opposite sides of the orifice plate 11 and suitable bolts 15 pass through said flanges and through the peripheral portion of the plate to securely mount said plate within the flow line. The provision of the reduced orifice 12 in the flow stream sets up a pressure differential across the plate and this pressure differential is, of course, dependent upon the size of the orifice as compared to the inner diameter of the flow line 10.

For by-passing a portion of the flowing gas around the orifice plate 11, a by-pass pipe 16 has its lower end connected into a radial port 17, which is formed in the flange of the collar 13. The upper portion of the pipe extends through an opening 18 which is formed in a base plate 19 and the extreme upper end of said by-pass pipe is connected to a diaphragm type displacement meter 20. The meter is of the usual construction and may be purchased on the open market, and it is not believed necessary to describe said meter in detail. The meter is mounted within a housing or casing 21, which is formed with a flange 22 on its lower end. This flange overlies the peripheral portion of the base plate 19 and is secured thereto by suitable bolts 23 and nuts 24. A gasket 25 is interposed between the flange 22 and the base plate, whereby a fluid-tight seal is effected at the joint. The by-pass pipe 16, which extends through the opening 18 in the base plate, is preferably welded, or otherwise secured to said plate, as is illustrated in Figure 1.

The gas which is flowing through the main line 10 may pass upwardly through the opening 17 and into the by-pass pipe 16, from which it flows into the meter 20. A suitable hand valve 26 may be connected in the pipe 16 immediately above the lower end thereof, whereby if desired flow into the by-pass line may be completely shut off. The gas which flows upwardly through the by-pass line 16 passes through the meter 20 and then flows into a return pipe 27, which pipe has its upper end connected to the outlet side of the meter 20. The pipe 27 extends downwardly through the housing 21 and through an opening 28 formed in the base plate 19. The pipe is suitably welded, or otherwise secured, to the base plate and the lower end of said pipe has connection with an opening 29 which is formed in one of the connecting collars 14. Thus, it will be seen that the gas which flows upwardly in the by-pass pipe 16 passes through the meter 20 and is then returned to the main flow line 10 through the pipe 27, such return being on the opposite side of the orifice plate 11. In this manner, a portion of the gas from the main flow line is by-passed around the orifice plate 11, being conducted through the meter 20. A suitable hand valve 30 may be connected in the lower portion of the pipe 27, whereby flow therethrough may be shut off.

For creating a pressure differential within the by-pass pipe 16, a precision valve 31 is connected in said by-pass line above the manually operated control valve 26 (Figure 1). The valve is clearly shown in Figure 8 and includes a valve body 32 which is provided with a transverse partition or deck 33 therein. The deck is formed with an opening 34 therein, and a cylindrical valve member or plunger 35 is movable within said opening. A diametrically extending notch 36, which is of an inverted V-shape is formed in the bottom of the plunger 35 and, manifestly, as the plunger is moved vertically within the opening, more or less of the inverted V-slot or notch is disposed above the deck 33, whereby the flow area through the opening and past the deck is controlled. The plunger has a valve stem 37 extending upwardly therefrom and this stem is screw-threaded into a collar 38 which is preferably formed integral with the valve body. A suitable stuffing box 39 surrounds the valve stem so as to prevent leakage around the threads thereof. The upper end of the stem projects from the stuffing box and has a suitable handwheel 40 thereon, whereby manual manipulation of the valve is facilitated. An indicator disk 41 is secured to the stem and, as said valve plunger 35 is moved vertically within the valve body, the valve disk travels vertically with relation to an indicator arm 42, which may carry suitable graduations or indications, to indicate the position of the valve plunger.

With the valve in the position shown in Figure 8, the extreme upper end of the inverted V-notch or slot 36 is above the top of the deck 33 and therefore a restricted flow past the valve seat is permitted. If the valve stem is rotated to raise the valve plunger 35, a greater area of the notch 36 will be exposed above the deck, whereby the size of the orifice is increased. Similarly, if the stem is rotated in an opposite direction, and the plunger is moved downwardly, then the flow through the valve body will be shut off. With this arrangement, it is possible to vary the size of the orifice through which the by-passed gas flows. Of course, the size of the orifice will control the quantity of gas and will also set up a pressure differential across the valve. This pressure differential will be proportional at all times to the pressure differential across the orifice 12 in the main flow stream. That is, if the pressure differential across the orifice plate 11 increases, a resultant increase in the pressure differential across the orifice of the valve plunger 35 will occur.

The usual diaphragm type displacement meter 20 which is illustrated is provided with a rotatable shaft 43 and this shaft is operated by the gas flowing through said meter. The shaft is shown in Figure 2 and said shaft is ordinarily connected with an indicator (not shown) which traverses a dial (not shown). The dial is ordinarily mounted within a dial recess 44 provided at one side of the meter housing. In carrying out the present invention, the usual dial and indicator are removed from the recess and a plate 45 overlies said recess, being secured to the front of the meter housing. The base of the recess is formed with an opening 46 within which a stuffing box 47 is mounted. A stub shaft 48 extends through the stuffing box and through the cover plate 45 and has its inner end connected, by means of a cotter key 49, with the rotatable meter shaft 43, whereby when said shaft is rotated by the gas flowing through the meter the stub shaft 48 is also rotated. A sprocket 49' is keyed or otherwise secured onto the outer end of the stub shaft 48, whereby said sprocket is rotated when the shaft 43 is rotated by the gas flowing through said meter.

A liquid container or receptacle 50, which is adapted to receive the liquid odorant which is to be introduced into the main line 10, is mounted within the casing 21 above the meter 20, said receptacle being supported by suitable brackets 51 which are secured to uprights or posts 52 mounted on the top of the meter housing 20. The tank is substantially rectangular in shape and has a liquid pump P mounted therein. The pump is adapted to pick up the liquid in the receptacle 50 and discharge the same into a compartment 53 which is formed at one side of the receptacle. The compartment 53 has a baffle 54 located near its discharge end and, as is clearly shown in Figure 6, said baffle is provided with a plurality of graduated openings 55 which are disposed vertically therein and which are gradually enlarged toward the upper end of said baffle. The purpose of these openings is to provide an even flow of liquid from the compartment 53, as will be hereinafter explained. The lower end of the compartment communicates through a discharge tube 56 with the upper end of the return pipe 27, whereby the liquid which is picked up by the pump P and directed into the compartment 53 flows into the return pipe and then into the main flow line 10.

The construction of the liquid pump P is clearly shown in Figures 2, 4 and 5 and includes a curved tube 57, which has its outer end open. The inner end of the tube is secured to a sleeve 58 and communicates with the interior of said sleeve through an opening 59. The sleeve 58 surrounds a portion of a drive shaft 60 and said sleeve is welded, or otherwise secured, to the shaft so as to be rotatable therewith. A radial arm 61 extends outwardly from the sleeve 58 and has a weight 62 adjustably secured thereto, whereby the weight counterbalances the tube 57 which is rotated when the shaft and sleeve are rotated.

The drive shaft 60 extends transversely across the interior of the upper portion of the receptacle 50 and has one end journaled in one side wall of said receptacle, while the opposite end of said shaft is journaled in the side wall of the compartment 53 (Figure 2). That end of the shaft which is journaled in the side wall of the liquid container or receptacle 50 projects outwardly beyond said wall and has a sprocket 63 secured thereto. This sprocket is vertically alined with the drive sprocket 49' on the stub shaft 48, which shaft is driven by the meter shaft 43, and the sprockets 49' and 63 are connected by a suitable drive chain 64. With this arrangement, it will be manifest that the meter shaft 43, which is actuated by the gas flowing through the meter 20, serves to drive the pump shaft 60, whereby the pump is operated in accordance with the gas flowing through the meter. It is manifest that by changing the ratio of the sprockets 49' and 63 to each other, the pump may be operated at any given speed for a given amount of gas passing through the meter.

As the drive shaft 60 is rotated, the pick-up tube 57 of the pump P (Figure 5) rotates in a counter-clockwise direction, whereby the open end of said tube dips downwardly into the liquid standing in the lower end of the receptacle 50. Some of the liquid is thus picked up by the curved tube 57 and, as said tube continues its rotation, said liquid flows downwardly through the tube and into the sleeve 58 which surrounds the drive shaft 60. From the sleeve, the liquid flows outwardly and downwardly into the compartment 53, and then through the openings 55 in the transverse baffle 54 of said compartment. From the compartment, the liquid is conducted through the tube 56 to the return pipe 27 and then to the main flow line 10, through which the main gas stream is flowing. It will be manifest that the level of the liquid within the receptacle will control the amount of liquid which the tube 57 picks up upon each revolution. If the level is as shown in Figure 5 by the dotted line, then only a small amount or quantity of liquid is picked up on each revolution of the tube. However, if the level were raised, it is obvious that a greater amount or quantity of liquid will be picked up upon each revolution of said tube. Therefore, by varying the liquid level within the receptacle 50, it is possible to vary the output of the pump, that is, it is possible to control the amount of liquid discharged upon each revolution of the tube 57. For preventing the liquid which is picked up on the tube and which may accumulate on the outer surface of the tube from travelling along the drive shaft 60 and escaping past the side walls in which the ends of the shaft are journaled, a pair of baffle plates 65 may be secured to the shaft 60 near the extremities thereof.

For maintaining a desired liquid level within the receptacle 50, in order to control the output of the pump P, a float 66 is provided. This float extends downwardly into the receptacle and is carried by a threaded stem 67. The stem is threaded through the outer end of a pivoted lever 68, which lever has a counterbalancing weight 69 on its opposite end. The lever is mounted on a pivot pin 70 which is secured within depending lugs 71 formed on the lower end of an inlet nozzle 72. The inlet nozzle is secured to the upper end of the receptacle and overlies the lever arm 68, as is clearly shown in Figures 3 and 4. The nozzle is provided with a laterally directed passage 73 which has a valve seat 74 mounted at its inner end. A valve member 75 is adapted to engage the seat 74 and is movable vertically with relation thereto. The lower end of the valve member 75 rests on the lever arm 68 and, when said arm is in a raised position, as shown in Figure 4, the valve is closed. The position of the arm 68 is, of course, controlled by the float 66 carried by its outer end and, whenever the liquid level within the receptacle 50 falls, the lever arm is swung downwardly on its pivot 70, whereby the valve member 75 is moved away from its seat 74. As explained, the float stem 67 is adjustable within the lever arm and carries an indicating disk 76 at its upper end. This disk is movable vertically with relation to an indicator bracket 77 which carries suitable graduations or indications thereon. The position of the disk, with relation to the indicator 77, denotes the position of the float 66, with the result that the level at which the liquid is held or maintained within the receptacle may be readily determined.

The nozzle 72 has its outer end connected by means of a tube 78 with the lower end of a stand pipe 79, which pipe is secured to a storage tank 80. The lower portion of the stand pipe 79 is connected through a pipe 81 with the lower end of the tank 80 and a suitable hand valve 82 is connected in the pipe 81. The upper portion of the stand pipe 79 also has communication through a short pipe 83 with the upper end of the liquid storage tank 80. A tube 84 also establishes communication between the extreme upper end of the pipe 79 and the upper end of the casing 21, which houses the meter and pump apparatus. A suitable gauge glass 85 may be mounted at one side of the stand pipe 79 to denote the liquid level within the tank 80.

The liquid from the storage tank 80 flows through the pipe 81, into the lower portion of the stand pipe 79 and then through the tube 78 into the nozzle 72. When the valve 75 is unseated, this liquid may enter the receptacle 50 to maintain the liquid level within said receptacle. Since the upper end of the receptacle 50 is open to the interior of the casing 21, it is necessary that the pressure within the casing 21 be equalized with the pressure in the liquid tank 80 to assure a flow downwardly through the tube 78. For this purpose, a vent opening 86 is formed in the extreme upper end of the return pipe 27, whereby gas which has passed through the meter and is flowing through the return pipe may escape into the casing 21. Since the upper portion of the casing 21 communicates with the upper portion of the liquid tank through the tube 84, stand pipe 79 and pipe 83, it is manifest that the pressures within the casing 21 and the tank 80 will be equalized at all times. This will assure that a constant flow of liquid from the storage tank 80 to the inlet nozzle 72 will occur.

In the operation of the device, the apparatus is adjusted so as to deliver a predetermined quantity of liquid odorant to the flowing gas stream per a predetermined number of cubic feet of gas flowing through said line. These adjustments are made by properly adjusting the precision valve 31 and by fixing the ratio between the drive sprockets 49' and 63, as well as by maintaining the liquid level within the liquid receptacle 50, whereby the pump delivers a predetermined quantity of liquid upon each revolution thereof. For example, supposing that 100,000 cubic feet of free gas is flowing through the line 10, then a fixed or predetermined pressure differential across the orifice 12 is present. A portion of the free gas is flowing through the by-pass line 16 and, therefore, a predetermined pressure differential, which is proportionate to the pressure differential across the orifice 12, is present across the valve 31. The gas flows through the meter to rotate the shaft 43 and thereby operate the drive sprockets 49' and 63 to rotate the pump. Since the level of the liquid within the receptacle 50 has been adjusted, the pump will deliver a predetermined quantity of liquid to the flow line upon each revolution thereof. So long as the conditions, for which the apparatus has been adjusted, remain or are maintained, then the proper quantity of liquid is at all times delivered to the flow line.

If the volume of the gas flowing through the line 10 changes, a variation in the pressure differential across the orifice 12 occurs. However, since the valve 31 has a pressure differential thereacross, which is proportional to the pressure differential across the orifice 12, a change occurs in the differential across the valve 31, with the result that the pump is operated at a different speed of rotation. Therefore, a different amount of liquid, in accordance with the change in volume, is delivered to the flow line 10 and thus the provision of the valve in the by-pass line 16 provides for the apparatus automatically adjusting itself to continue to deliver the proper quantity of liquid.

However, if the pressure in the flow line 10 varies from the initial working pressure, for which the orifice plate 11 has been installed and for which the various adjustments have been made, then the volumetric displacement through the displacement meter varies indirectly as the ratio of the actual working pressure to the initial pressure. In other words, the increase in pressure on the inlet side of the orifice plate 11 results in a variation of the volumetric displacement through the meter. Such variation in the volumetric displacement of the meter 20 causes a change in the speed of the pump P, since said pump is driven directly from the meter. The pressure variation in the inlet side of the line 10 has not affected the volume of gas flowing through said line and, in order for the apparatus to operate efficiently, the pump must deliver the same amount of liquid to the line, regardless of the pressure. Thus, it will be seen that when a pressure variation occurs, a change in the speed of the pump occurs and, in order for efficient operation, it is necessary at this time to either speed up the pump P or increase the amount of liquid which the pump is delivering upon each stroke. As explained, the volumetric displacement through the meter 20 varies indirectly as the ratio of the actual working pressure to the initial pressure. In order to maintain the volumetric displacement directly proportional to the quantity, it is only necessary to adjust the precision valve 31 to increase the size of the orifice in the by-pass line 16. When this is done, the pump is maintained operating at its original speed and therefore delivers the same amount of liquid to the flow line.

Of course, it would be possible to leave the valve 31 in its same position and to change the liquid level in the receptacle 50. In such instance, the speed of the pump would be varied because of the change in pressure of the gas, as has been explained, but the change in the liquid level would cause the pump to deliver more or less liquid upon each operation or revolution to compensate for the changed condition. Thus, it will be seen that the apparatus will constantly deliver a predetermined quantity of liquid to the flow line, regardless of the pressure change in said line.

In order to more fully explain the operation and the principle of the improved apparatus, the following is submitted, wherein:

$Q_1$ equals cubic feet of gas per hour flowing through line 10
$Q_2$ equals cubic feet of gas per hour flowing through by-pass 16
$C_1$ equals coefficient of orifice 12
$C_2$ equals coefficient of orifice in valve 31
$D$ equals differential pressure across orifice
$P$ equals absolute pressure
$A$ equals atmospheric pressure
$V$ equals volumetric displacement in cubic feet in meter 20.

The flow of gas passing through the orifice 12 in the flow line 10 conforms to the formula: $Q1=C1\sqrt{D\times P}$ and the flow through the precision valve conforms to the similar formula $Q2=C2\sqrt{D\times P}$, whereas the flow of gas through the displacement meter conforms to the formula $Q2=VP/A$. The by-passed gas flows through both the precision valve 31 and the displacement meter 20 so that $C2=\sqrt{D\times P}=VP/A$. The maximum hourly rate of displacement or V through the meter is limited and to maintain V constant to maintain the speed of the pump constant, when the pressure P increases, it is necessary to increase C2 (the coefficient of orifice in valve 31) according to the square root of the absolute pressure. This is necessary to maintain V (volumetric displacement in meter) in direct proportion to Q1 (quantity of gas flowing through main line 10). Thus, the setting of the precision valve 31 is a function of the square root of the absolute pressure. When the pressure varies from the initialed pressure, for which the apparatus is adjusted, then V, or the volumetric displacement through the meter varies indirectly as the ratio of the actual or new pressure to the initial or base pressure. When this occurs, in order to maintain V directly proportional to Q1, it is also necessary to adjust the valve 31 to change its orifice (C2) and thus change the quantity of gas (Q2) flowing through the by-pass and meter, directly in proportion to the ratio of the change in pressures. By so adjusting the valve 31, the liquid is delivered in direct proportion to the gas flowing through the line 10.

It is noted that if the pressure in the by-pass exceeds approximately 50 pounds gauge pressure, the pressure drop which occurs across the meter is excessive and has been found to result in excessive wear on the meter. Therefore, when pressures exceeding 50 pounds are encountered, it is desirable to adjust the output of the liquid pump P rather than further adjust the precision valve. The adjustment of the pump will be hereinafter more fully explained.

From the foregoing, it will be seen that the device is readily adjusted to take care of any change in pressure condition. Accurate odorization is had at any rate of flow and the apparatus does not include any small orifices which may become clogged or stopped up.

The pump P is constructed so that the curved tube dips down into the liquid upon each revolution and, according to the liquid level, picks up a predetermined amount of liquid upon each revolution. This amount or quantity of liquid is definitely fixed and is positively delivered to the flow line. The construction of the pump is such that temperature or pressure conditions do not affect the amount of liquid delivered by said pump. Thus, no error due to the temperature or the viscosity of the liquid odorant can occur.

Although any liquid storage tank can be employed for delivering the liquid odorant to the receptacle 50, the tank shown in Figure 1 and described herein has been found most suitable. The arrangement of the tank and its associate parts makes it possible to accurately test the volume or quantity of odorant which is being fed into the flow line 10. Referring to Figure 1, it is pointed out that when the valve 82 is open, the liquid flows directly from the tank through the line 78 and through the inlet nozzle 72 to the receptacle 50. When it is desired to test for the amount of liquid being directed into the flow line, the valve 82 is closed, with the result that the liquid flows from the stand pipe 79 downwardly through the tube 78. The amount of liquid within the stand pipe is registered by the gauge 85 and, through the use of a test scale (not shown), the volume of liquid flowing from the stand pipe 79 can be read in thousandths of a gallon. The thousandths of a gallon so indicated, as being used during any specified period of time, can then be compared to the reading of a meter which is measuring the total gas flow for the same period of time through the line 10 and, thus, an accurate indication of the volume of liquid odorant per million cubic feet of gas, can readily be had.

In Figure 9, an automatic type of precision valve 31' is disclosed. This valve is substituted for the manually operated valve 31 and is connected in the by-pass line 16, the flow through this valve being in the direction of the arrows in Figure 9. In this form, the valve stem 37' has its upper end connected to a flexible bellows 90, which is of a predetermined resistance. A lever 91 overlies the bellows 90 and has one end pivoted to an arm 92, which has its lower end mounted on the valve body. An adjusting screw 93 is threaded through the lever and has its lower end engaging the top of the bellows 90. The outer end of the lever is arranged to be connected by means of a spring 94 with an extension 31a, which is formed on the valve body. It is noted that the spring may be connected to the lever and to the extension at various positions with relation to the pivot of the lever, whereby it will exert a predetermined force. Obviously, since the screw 93 engages the bellows, the tension or pressure of the spring 94 is constantly exerting downwardly on the bellows to urge the valve member 35 to its closed position.

The static pressure or the pressure of the gas flowing through the main line 10 is exerted against the underside of the valve member 35 and the spring and lever are so adjusted that a predetermined size orifice is present under predetermined pressure conditions. If the pressure of the flowing gas should decrease, then the spring will immediately pull the lever downwardly to further reduce the orifice; similarly, if the pressure below the valve increases, then the valve is raised to increase the orifice and take care of the pressure change. The operation of the apparatus when the automatic precision valve 31' is employed is exactly the same as hereinbefore described. However, the use of this valve makes the adjustment of the orifice automatic in accordance with the pressure changes.

The foregoing description of the invention is explanatory thereof and various changes in the size, shape and materials, as well as in the details of the illustrated construction, may be made, within the scope of the appended claims, without departing from the spirit of the invention.

What we claim and desire to secure by Letters Patent is:

1. An apparatus for introducing liquid into a flowing gas stream including, a main flow line through which the gas stream is conducted, a restriction in said line for setting up a pressure differential in the line, such differential being across the restriction, a by-pass conductor for by-passing a portion of the gas around the restriction in the main flow line, a variable restriction in the by-pass conductor whereby a pressure differential proportional to the differential in the main line is set up in said conductor, a liquid pump having communication with the main line for introducing a liquid into the flowing gas stream, and means for utilizing the by-passing gas to actuate the liquid pump, whereby the quantity of liquid introduced is proportional to the volume of gas flowing through the line.

2. An apparatus for introducing liquid into a flowing gas stream including, a main flow line through which the gas stream is conducted, a restriction in said line for setting up a pressure differential in the line, such differential being across the restriction, a by-pass conductor for by-passing a portion of the gas around the restriction in the main flow line, a variable restriction in the by-pass conductor whereby a pressure differential proportional to the differential in the main line is set up in said conductor, a liquid pump having communication with the main line for introducing a liquid into the flowing gas stream, means for utilizing the by-passing gas to actuate the liquid pump, whereby the quantity of liquid introduced is proportional to the volume of gas flowing through the line, and means for changing the size of the restriction in the by-pass conductor to vary the flow through said conductor and thereby compensate for a variation in pressure of the flowing gas to maintain the introduction of liquid proportional to the volume of gas flowing through the main line.

3. An apparatus for introducing liquid into a flowing gas stream including, a main flow line through which the gas stream is conducted, a restriction in said line for setting up a pressure differential in the line, such differential being across the restriction, a by-pass conductor for by-passing a portion of the gas around the restriction in the main flow line, a variable restriction in the by-pass conductor whereby a pressure differential proportional to the differential in the main line is set up in said conductor, a liquid pump having communication with the main line for introducing a liquid into the flowing gas stream, said pump being adjustable so that its output may be varied, and means for utilizing the by-passing gas to actuate the liquid pump, whereby the quantity of liquid introduced is proportional to the volume of gas flowing through the line.

4. An apparatus for introducing liquid into a flowing gas stream including, a main flow line through which the gas stream is conducted, a restriction in said line for setting up a pressure differential in the line, such differential being across the restriction, a by-pass conductor for by-passing a portion of the gas around the restriction in the main flow line, a variable restriction in the by-pass conductor whereby a pressure differential proportional to the differential in the main line is set up in said conductor, a liquid pump having communication with the main line for introducing a liquid into the flowing gas stream, said pump being adjustable so that its output may be varied, means for utilizing the by-passing gas to actuate the liquid pump, whereby the quantity of liquid introduced is proportional to the volume of gas flowing through the line, and means for varying the output of the pump to compensate for a variation in pressure of the flowing gas, whereby the introduction of liquid is maintained proportional to the volume of gas flowing through the main line.

5. An apparatus for introducing liquid into a flowing gas stream including, a main flow line through which the gas stream is conducted, a restriction in said line for setting up a pressure differential in the line, such differential being across the restriction, a by-pass conductor for by-passing a portion of the gas around the restriction in the main flow line, a variable restriction in the by-pass conductor whereby a pressure differential proportional to the differential in the main line is set up in said conductor, a liquid pump having communication with the main line for introducing a liquid into the flowing gas stream, means for utilizing the by-passing gas to actuate the liquid pump, whereby the quantity of liquid introduced is proportional to the volume of gas flowing through the line, means for changing the size of the restriction in the by-pass conductor to vary the flow through said conductor and thereby compensate for a variation in pressure of the flowing gas to maintain the introduction of liquid proportional to the volume of gas flowing through the main line, and means for varying the output of the liquid pump to further compensate for pressure variation in the flowing gas stream.

6. An apparatus for introducing liquid into a flowing gas stream including, a main flow line through which the gas stream is conducted, a restriction in said line for setting up a pressure differential in the line, such differential being across the restriction, a by-pass conductor for by-passing a portion of the gas around the restriction in the main flow line, a variable restriction in the by-pass conductor whereby a pressure differential proportional to the differential in the main line is set up in said conductor, a liquid pump having communication with the main line for introducing a liquid into the flowing gas stream, means for utilizing the by-passing gas to actuate the liquid pump, whereby the quantity of liquid introduced is proportional to the volume of gas flowing through the line, and means automatically operable by the pressure of the flowing gas for changing the size of the restriction in the by-pass conductor to vary the flow through said conductor and thereby compensate for a variation in pressure of the flowing gas to maintain the introduction of liquid proportional to the volume of gas flowing through the main line.

7. An apparatus for introducing liquid into a flowing gas stream including, a main flow line through which the gas stream is conducted, a restriction in said line for setting up a pressure differential in the line, such differential being across the restriction, a by-pass conductor for by-passing a portion of the gas around the restriction in the main flow line, a variable restriction in the by-pass conductor whereby a pressure differential proportional to the differential in the main line is set up in said conductor, a liquid pump comprising a liquid receptacle having a rotatable tubular element therein, means within the receptacle for maintaining a predetermined liquid level in said receptacle, whereby the tubular element picks up a predetermined quantity of liquid upon each revolution, means for conducting the liquid from said element to the main flow line, and means for utilizing the gas flowing through the by-pass conductor for actuating the liquid pump.

8. An apparatus for introducing liquid into a flowing gas stream including, a main flow line through which the gas stream is conducted, a restriction in said line for setting up a pressure differential in the line, such differential being across the restriction, a by-pass conductor for by-passing a portion of the gas around the restriction in the main flow line, a variable restriction in the by-pass conductor whereby a pressure differential proportional to the differential in the main line is set up in said conductor, a liquid pump comprising a liquid receptacle having a rotatable tubular element therein, means within the receptacle for maintaining a predetermined liquid level in said receptacle, whereby the tubular element picks up a predetermined quantity of liquid upon each revolution, means for conducting the liquid from said element to the main flow line, a metering device connected in the by-pass conductor and actuated by the gas flowing through said conductor, and means for operatively connecting the metering device to the pump whereby the latter is driven by said device.

9. An apparatus for introducing liquid into a flowing gas stream including, a main flow line through which the gas stream is conducted, a restriction in said line for setting up a pressure differential in the line, such differential being across the restriction, a by-pass conductor for by-passing a portion of the gas around the restriction, a meter connected in the by-pass conductor and operated by the gas flowing therethrough, a liquid pump for introducing a liquid into the main flow line, and means for operatively connecting the meter and the pump, whereby the latter is driven by said meter and the liquid is introduced into the main line in proportion to the volume of gas flowing therethrough.

DONALD A. SILLERS.
ALEXANDER CLARKE.